United States Patent
Kawamura et al.

(10) Patent No.: US 11,431,015 B2
(45) Date of Patent: Aug. 30, 2022

(54) FUEL CELL AND MANUFACTURING METHOD OF THE SAME

(71) Applicant: TAIYO YUDEN CO., LTD., Tokyo (JP)

(72) Inventors: Chie Kawamura, Tokyo (JP); Xinyu Li, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 239 days.

(21) Appl. No.: 16/790,140

(22) Filed: Feb. 13, 2020

(65) Prior Publication Data

US 2020/0274182 A1  Aug. 27, 2020

(30) Foreign Application Priority Data

Feb. 25, 2019 (JP) .............................. JP2019-031811

(51) Int. Cl.
  *H01M 8/12* (2016.01)
  *H01M 4/86* (2006.01)
  *H01M 4/90* (2006.01)

(52) U.S. Cl.
  CPC ............. *H01M 8/12* (2013.01); *H01M 4/861* (2013.01); *H01M 4/9066* (2013.01); *H01M 2008/1293* (2013.01)

(58) Field of Classification Search
  CPC ............... H01M 4/905; H01M 4/9066; H01M 2008/1293; H01M 4/861
  See application file for complete search history.

(56) References Cited

U.S. PATENT DOCUMENTS

| | | | | |
|---|---|---|---|---|
| 2010/0086824 A1* | 4/2010 | Homel | ................ | H01M 8/0252 429/406 |
| 2013/0337360 A1* | 12/2013 | Mahoney | ................ | C04B 35/01 429/465 |
| 2016/0172683 A1* | 6/2016 | Sabolsky | ............ | H01M 8/1246 429/523 |
| 2019/0214667 A1* | 7/2019 | Kim | ...................... | H01M 8/126 |

FOREIGN PATENT DOCUMENTS

JP      2007103077      *   4/2007

OTHER PUBLICATIONS

JP2007103077 English translation. Misono et al. Japan. Apr. 19, 2007. (Year: 2007).*

(Continued)

*Primary Examiner* — Christopher P Domone
(74) *Attorney, Agent, or Firm* — Stein IP, LLC

(57) ABSTRACT

A fuel cell includes: a porous anode; and an electrolyte layer that is provided on the anode and includes solid oxide having oxygen ion conductivity, wherein the anode has a structure in which an anode catalyst is provided in a void, wherein, in a cross section of the anode and the electrolyte layer in a stacking direction thereof, an average void diameter of voids in the anode is 0.1 μm or more and 2 μm or less, wherein, in the cross section, a D10% diameter of void diameter distribution of the voids in the anode is 0.1 μm or mode and 2 μm or less, wherein a D90% diameter of the void diameter distribution is 1 μm or more and 7 μm or less.

9 Claims, 4 Drawing Sheets

(56) References Cited

OTHER PUBLICATIONS

Peter Blennow et al., "Development of Planar Metal Supported SOFC with Novel Cermet Anode", ECS Transactions, vol. 25, Issue 2, pp. 701-710, 2009.
Trine Klemensø et al., "High performance metal-supported solid oxide fuel cells with Gd-doped ceria barrier layers", Journal of Power Sources, vol. 196, Issue 22, pp. 9459-9466, Nov. 15, 2011.
Peter Blennow et al., "Manufacturing and characterization of metal-supported solid oxide fuel cells", Journal of Power Sources, vol. 196, Issue 17, pp. 7117-7125, Sep. 1, 2011.

\* cited by examiner

FUEL CELL AND MANUFACTURING METHOD OF THE SAME

CROSS-REFERENCE TO RELATED APPLICATION

This application is based upon and claims the benefit of priority of the prior Japanese Patent Application No. 2019-031811, filed on Feb. 25, 2019, the entire contents of which are incorporated herein by reference.

FIELD

A certain aspect of the present invention relates to a fuel cell and a manufacturing method of the fuel cell.

BACKGROUND

A solid oxide fuel cell has a solid oxide electrolyte layer having oxygen ion conductivity, an anode and a cathode. In the anode, oxygen ions from the cathode via the solid oxide electrolyte layer react with hydrogen included in fuel gas. By the reaction, electrical power is generated (for example, see ECS Transactions, 25(2) 701-710 (2009), Journal of Power Sources 196 (2011) 9459-9466, and Journal of Power Sources 196 (2011) 7117-7125).

SUMMARY OF THE INVENTION

It is effective to increase the number of reaction site per a unit volume in an anode, in order to improve performance of electrical power generation of the solid oxide fuel cell. And so, it is thought that porosity of the anode is enlarged. However, when the porosity of the anode is enlarged, bonding strength of an interface between the anode and the electrolyte layer is reduced and film peeling may occur. However, when the separator is made by pressing a steel board, the separator becomes thick. Therefore, a size of the fuel cell is enlarged.

The present invention has a purpose of providing a fuel cell that is capable of improving performance of electrical power generation and a manufacturing method of the fuel cell.

According to an aspect of the present invention, there is provided a fuel cell including: a porous anode; and an electrolyte layer that is provided on the anode and includes solid oxide having oxygen ion conductivity, wherein the anode has a structure in which an anode catalyst is provided in a void, wherein, in a cross section of the anode and the electrolyte layer in a stacking direction thereof, an average void diameter of voids in the anode is 0.1 μm or more and 2 μm or less, wherein, in the cross section, a D10% diameter of void diameter distribution of the voids in the anode is 0.1 μm or mode and 2 μm or less, wherein a D90% diameter of the void diameter distribution is 1 μm or more and 7 μm or less.

According to another aspect of the present invention, there is provided a manufacturing method of a fuel cell including: preparing a structure in which an electrolyte layer having oxygen ion conductivity is provided on a porous anode, wherein the anode has a structure in which an anode catalyst is provided in a void, wherein, in a cross section of the anode and the electrolyte layer in a stacking direction thereof, an average void diameter of voids in the anode is 0.1 μm or more and 2 μm or less, wherein, in the cross section, a D10% diameter of void diameter distribution of the voids in the anode is 0.1 μm or mode and 2 μm or less, wherein a D90% diameter of the voids diameter distribution is 1 μm or more and 7 μm or less; and impregnating an anode catalyst into the anode.

DETAILED DESCRIPTION

A description will be given of an embodiment with reference to the accompanying drawings.

Figure 1:
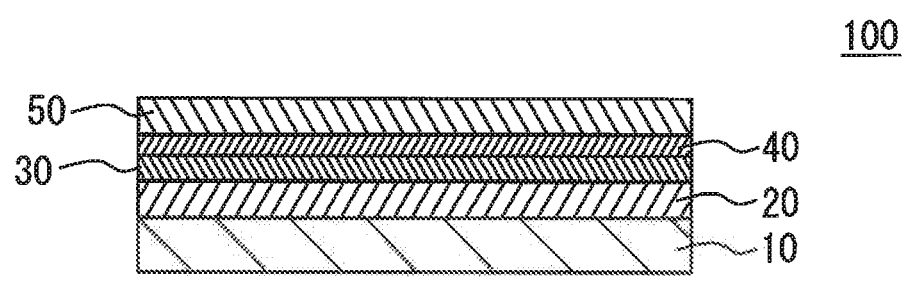
FIG. 1 illustrates a schematic cross sectional view of a multilayer structure of a fuel cell.

FIG. 1 illustrates a schematic cross sectional view of a multilayer structure of a fuel cell 100. As illustrated in FIG. 1, as an example, the fuel cell 100 has a structure in which an anode 20, an electrolyte layer 30, a reaction prevention layer 40 and a cathode 50 are stacked on a supporter 10 in this order.

The supporter 10 has gas permeability and can support the anode 20, the electrolyte layer 30, the reaction prevention layer 40 and the cathode 50. The supporter 10 is, for example, a metal porous body such as a porous body of Fe—Cr alloy.

The anode 20 is an electrode having electrode activity as an anode and has electron conductivity and oxygen ion conductivity. For example, the anode 20 has scandia yttria stabilized zirconia (ScYSZ) as the material having the oxygen ion conductivity. For example, it is preferable that ScYSZ having a composition range including 5 mol % to 16 mol % of scandia ($Sc_2O_3$) and 1 mol % to 3 mol % of yttria ($Y_2O_3$) is used. It is more preferable that ScYSZ of which a total amount of the scandia and the yttria is 6 mol % to 15 mol % is used. This is because the highest conductivity of oxygen ion is achieved in the range. The material having the oxygen ion conductivity is a material of which a transport number of oxygen ion is 99% or more.

A metal can be used as the material having the electron conductivity of the anode 20. Alternatively, it is preferable that the material having the electron conductivity may be an alloy including one or more of C, Si, Y, Ce, Cr, Fe, Ti, Cu, Mn, La, W, Ni or Zr, and 10 wt % to 95 wt % of Cr, and 30 wt % or less of another element. In concrete, it is preferable that Fe-18 to 22 Cr alloy is used. When the metal and the material of the alloy are used, an SOFC system has large mechanical strength and has resistance against rapid temperature changing, With the characteristic, it is possible to mount the fuel system in a vehicle. When an amount of Cr is increased in the alloy, a thermal expansion coefficient of the anode 20 gets closer to a thermal expansion coefficient of the electrolyte layer 30. Therefore, the fuel cell 100 has resistance against crack. Moreover, when the amount of Cr of the alloy is large, the alloy has resistance against heat. Therefore, degradation of the cell during generating electrical power is suppressed. However, for the purpose of suppressing cost and Cr poisoning in the cathode 50, it is preferable that the amount of Cr is small. Therefore, the composition of Fe-18 to 22 Cr is preferable because a balance is adequate.

A material having both of the electron conductivity and the oxygen ion conductivity (an electron and oxygen ion conductive material) may be used as the anode 20. For example, the electron and oxygen ion conductive material is such as a $LaMnO_3$-based material, a $LaCoO_3$-based material or the like. However, in the one lot firing process, metal powder of the supporter 10 is fired together with the anode 20. Therefore, it is preferable that firing atmosphere is reductive atmosphere. When the $LaMnO_3$-based material or the $LaCoO_3$-based material is used as a main component of the electron and oxygen ion conductive material, it is difficult to fire the electron and oxygen ion conductive material in a reductive atmosphere although favorable performance of generating electrical power is achieved. And so, it is preferable that the main component of the electron and oxygen ion conductive material has resistance against reduction. For example, a $CeO_2$-based material in which Gd is doped, or the like may be used as the main component of the electron and oxygen ion conductive material.

when the anode 20 has both of the material having the electron conductivity and the material having the oxygen ion conductivity, voids of the anode 20 are formed by the material having the electron conductivity and the material having the oxygen ion conductivity. A part of the voids may be formed by only the material having the electron conductivity or formed by only the material having the oxygen ion conductivity. When the anode 20 has the electron and oxygen ion conductive material, the voids of the anode 20 are formed by the electron and oxygen ion conductive material.

The anode 20 has an anode catalyst in the voids. The anode catalyst includes Ni, and one of $BaCe_{1-x}Zr_xO_3$ (BCZY, x=0 to 1) in which Y is doped, $SrCe_{1-x}Zr_xO_3$ (SCZY, x=0 to 1) in which Y is doped, $LaScO_3$ (LSS) in which Sr is doped, and GDC. Alternatively, the anode catalyst includes Ni and a mixture two or more of BCZY, SCZY, LSS and GDC. The GDC is $CeO_2$ (ceria) in which Gd (gadolinium) is doped. In the following, the GDC may also be referred to as Gd-doped ceria. The metal acting as the anode catalyst may be in a compound phase in not generating electrical power. For example, Ni may be in NiO (nickel oxide) phase in not generating electrical power. These compounds are reduced by the reductive fuel gas applied to the anode 20 during generating electrical power and is in a metal phase acting as the anode catalyst.

A main component of the electrolyte layer 30 is solid oxide having the oxygen ion conductivity. The electrolyte layer 30 is a densified layer having gas non-permeability. It is preferable that the main component of the electrolyte layer 30 is such as ScYSZ. When a total concentration of $Y_2O_3$ and $Sc_2O_3$ is 6 mol % to 15 mol %, the oxygen ion conductivity is the highest. It is therefore preferable that the material having the total concentration is used as the main component of the electrolyte layer 30. It is preferable that the thickness of the electrolyte layer 30 is 20 μm or less. It is more preferable that the thickness is 10 μm or less. The electrolyte layer has favorable performance when the electrolyte layer is thin. However, it is preferable that the thickness is 1 μm or more, from a viewpoint of suppressing gas leak of both sides of the electrolyte layer.

A main component of the reaction prevention layer 40 is a component for preventing the reaction between the electrolyte layer 30 and the cathode 50. The cathode 50 is an electrode having electrode activity as a cathode and has the electron conductivity and the oxygen ion conductivity. For example, the cathode 50 is such as LSC (lanthanum strontium cobaltite) having the electron conductivity and the oxygen ion conductivity. LSC is $LaCoO_3$ in which Sr (strontium) is doped. As an example, when the electrolyte layer 30 includes ScYSZ and the cathode 50 includes LSC, the reaction prevention layer 40 prevents the following reactions.

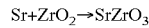
$$Sr+ZrO_2 \rightarrow SrZrO_3$$

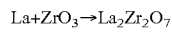
$$La+ZrO_3 \rightarrow La_2Zr_2O_7$$

The fuel cell 100 generates electrical power by the following operation. Oxidant gas including oxygen such as air is supplied to the cathode 50. In the cathode 50, the oxygen in the cathode 50 reacts with an electron supplied from an external electrical circuit and becomes an oxygen ion. The oxygen ion conducts through the electrolyte layer 30 and moves toward the anode 20. On the other hand, fuel gas including hydrogen such as hydrogen gas or reformed gas is supplied to the supporter 10. The fuel gas reaches the anode 20 via the supporter 10. The hydrogen in the anode 20 releases an electron, reacts with the oxygen ion having conducted through the electrolyte layer 30 from the cathode 50, and becomes water ($H_2O$). A released electron is extracted outward by an external electrical circuit. The extracted electron electrically works, and then is supplied to the cathode 50. With the operation, the electrical power is generated.

Figure 2:
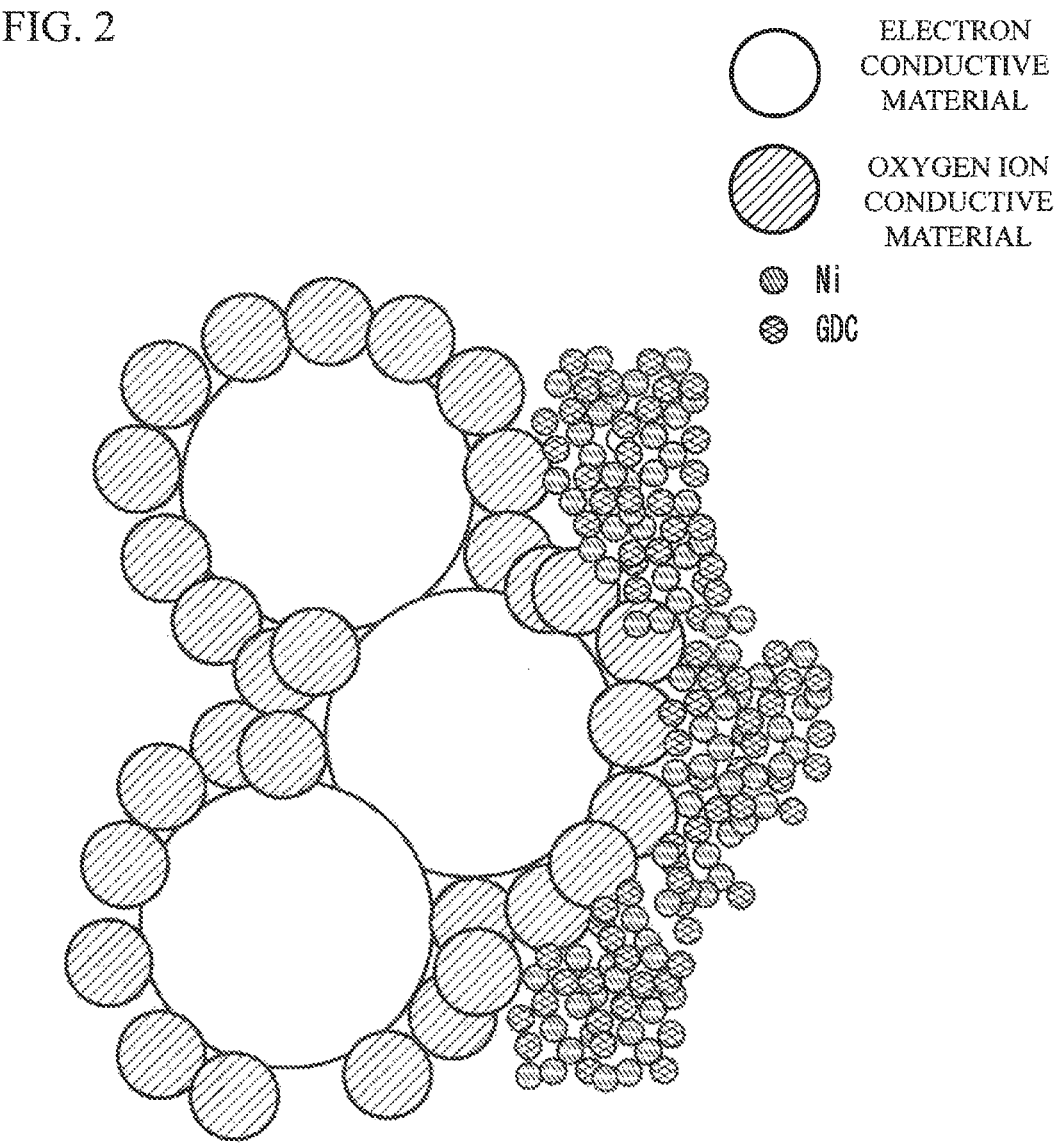
FIG. 2 illustrates an enlarged view of an anode.

As an example, it is thought that anode catalysts (Ni and GDC) are supplied into the anode by thermal treatment, after sintering the supporter, the electron conductive material of the anode, the oxygen ion conductive material of the anode, and the electrolyte layer together with each other, in the manufacturing of the fuel cell 100. However, when a diameter of a void is 3 μm or more, the number of void is small even if a porosity is 50% or more. Therefore, as illustrated in FIG. 2, before supplying the anode catalysts, the oxygen ion conductive material surrounds the electron conductive material. Therefore, there may be a case where a path of an electron is discontinued on the way. Therefore, before supplying the anode catalysts, electron conductivity of the anode is low. And, before supplying the anode catalysts, there may be a case where the oxygen ion conductive material is separated by the electron conductive material. Therefore, the conduction of the oxygen ion from the cathode and the electrolyte layer is suppressed.

Therefore, the anode catalyst supplied to near the interface of the electrolyte layer largely contributes to the electrical power generation. When the anode catalyst forms a three-phase interface (reaction site) with the oxygen ion conductive material and a gas phase, the electrical power is generated. And, when the anode catalyst forms a path of electron conduction, the electron conduction is achieved. For example, the Ni compound in the anode catalyst becomes Ni when exposed to reductive fuel gas. In this case, the electron conduction is achieved.

When the number of the reaction site per a unit volume becomes larger, the performance of the electrical power generation is improved more. It is preferable that the anode 20 has a large porosity in order to enlarge the number of the reaction site. However, when the diameter of the void in the interface between the electrolyte layer and the anode is excessively large, bonding strength of the interface is reduced and film peeling may occur. When the diameter of the void is excessively large, the number of the reaction site is reduced. And so, it is preferable that the diameter of the void in the anode 20 has an upper limit.

On the other hand, when the diameter of the void in the anode 20 is excessively small, it is difficult for anode impregnation solution to reach near the interface between the anode 20 and the electrolyte layer 30. A break may occur in the anode catalyst. And the electron conduction path formed by the anode catalyst during the electrical power generation may be broken on the way. And so, it is preferable that the diameter of the void in the anode 20 has a lower limit.

And so, in the embodiment, the anode 20 has an upper limit of an average diameter of the voids. In this case, the bonding strength of the interface between the anode 20 and the electrolyte layer 30 is secured and the porosity of the interface can be enlarged, because the anode 20 has a fine mesh structure frame. It is therefore possible to increase the number of the reaction site. In concrete, it is preferable that the average diameter of the voids in the anode 20 is 2 μm or less. It is more preferable that the average diameter is 1 μm or less. The void is a pore portion which can be observed in a cross section of the anode 20 in the stacking direction.

On the other hand, the average diameter of the voids in the anode 20 has a lower limit. In this case, the anode impregnation solution may reach near the interface between the anode 20 and the electrolyte layer 30. The break of the anode catalyst is suppressed. And the break of the electron conduction path can be suppressed. In concrete, the average diameter of the voids in the anode 20 is 0.1 μm or more. When the diameter of the void is small, it is preferable that the whole porosity is 80% so that there is no closed pore which is closed in the stacking direction and the in-plane direction. For example, it is possible to measure the void diameter distribution (D10% and D90%) and the average diameter by taking a few images of the cross sections of the anode 20 in the stacking direction of 5000 magnifications to 10000 magnifications by a SEM and measuring a tangential diameter of the voids in a constant direction which is a range of 50×50 μm or more.

Even if the average diameter of the voids in the anode 20 has the lower limit, there may be a lot of voids of which the diameter is excessively small. In this case, it may not be necessarily possible to sufficiently impregnate the anode catalyst. And so, in the embodiment, the D10% diameter is 0.1 μm or more and 2 μm or less, in the diameter distribution of the voids in the whole of the anode 20. In this case, it is possible to reduce the existence ratio of the voids of which the diameter is excessively small. On the other hand, even if the average diameter of the voids in the whole of the anode 20 has an upper limit, there may be a lot of voids of which the diameter is excessively large. In this case, it may not be necessarily possible to secure the bonding strength of the interface between the anode 20 and the electrolyte layer 30. And so, in the embodiment, the D90% diameter is 1 μm or more and 7 μm or less, in the diameter distribution of the voids in the whole of the anode 20. In this case, it is possible to reduce the existence ratio of the voids of which diameter is excessively large.

In this manner, in the embodiment, the average diameter of the voids in the anode 20 is 0.1 μm or more and 2 μm or less. The D10% diameter of the diameter distribution of the voids is 0.1 μm or more and 2 μm or less. And the D 90% diameter of the diameter distribution of the voids is 1 μm or more and 7 μm or less. In this case, it is possible to improve the electrical power generation performance.

It is preferable that the porosity of the anode 20 in the interface between the anode 20 and the electrolyte layer 30 is large, for the purpose of enlarging reaction possibility in the interface between the anode 20 and the electrolyte layer 30. In concrete, it is preferable that the porosity is 50% or more. It is more preferable that the porosity is 80% or more. However, when the porosity is excessively large, the film peeling may occur between the supporter 10 and the electrolyte layer 30 during the firing. And so, it is preferable that the porosity has an upper limit. In concrete, it is preferable that the porosity is 85% or less. For example, a picture of a range of 50 μm or more in the cross section of the interface in the stacking direction is taken with a magnification of 5000 to 10000 by a SEM. With respect to each diameter of voids in a range from the interface to 1 μm toward the anode, tangential diameters in a constant direction in parallel with the interface is measured in a range of 50 μm. And in accordance with the following formula, it is possible to measure the porosity of the interface.

$$\text{The porosity of the interface}(\%) = \{\text{a total of measured void diameters}(\mu m)\}/\{\text{the length of the interface}(50\ \mu m)\} \times 100$$

When an area ratio of the voids in the whole of the anode 20 is excessively small, a closed pore may be formed. In this case, the anode catalyst may not be necessarily impregnated into the anode 20. And so, it is preferable that the area ratio of the voids in the whole of the anode 20 has a lower limit. For example, it is preferable that the area ratio is 40% or more. On the other hand, when the area ratio is excessively large, the film peeling may occur between the supporter 10 and the electrolyte layer 30 during the firing. And so, it is preferable that the area ratio has an upper limit. For example, it is preferable that the area ratio is 80% or less. For example, it is possible to measure areas of the voids by taking a few images of the cross sections of the anode 20 in the stacking direction of 5000 magnifications to 10000 magnifications by a SEM and using image analysis software with respect to a range of 50×50 μm or more. And is it possible to a ratio of the areas with respect to the whole area for measurement, as the area ratio.

It is preferable that the thickness of the anode 20 is 5 μm or more and 60 μm or less. It is more preferable that the thickness of the anode 20 is 10 μm or more and 30 μm or less. The anode 20 is provided between the electrolyte layer 30 and the supporter 10 and achieves adhesion between the electrolyte layer 30 and the supporter 10. Therefore, when the thickness of the anode 20 is less than 5 μm, the structure of the anode 20 is not secured and interlayer peeling may occur. And in this case, the catalyst is not sufficiently impregnated into the anode 20. The number of the reaction site is reduced. The reaction resistance is enlarged. And the performance of the electrical power generation may be degraded. On the other hand, when the anode 20 is excessively large, the ohm resistance is large and the performance of the electrical power generation may be degraded. Therefore, there is a preferable thickness range of the anode 20.

Figure 3:
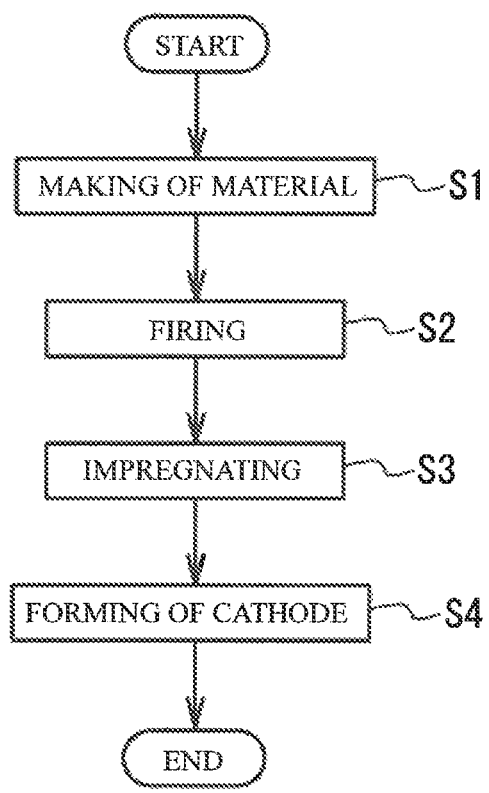
FIG. 3 illustrates a flow of a manufacturing method of a fuel cell.

A description will be given of a manufacturing method of the fuel cell 100. FIG. 3 illustrates a flow of the manufacturing method.

(Making process of a material for porous metal) Metal powder (for example, 10 μm to 100 μm of grain diameter), plasticizer (for example, 1 wt % to 6 wt % for the purpose of adjusting adhesion of a sheet), a solvent (20 wt % to 30 wt % of toluene, 2-propanol (IPA), 1-butanole, terpineol, butyl acetate, or ethanol, in accordance with viscosity), an extinction material (organic material), a binder (PVB, acrylic resin, ethyl cellulose or the like) are mixed. Thus, slurry is made as a material for porous metal. The material for porous metal is used as the material for forming the supporter 10. A volume ratio of organic component (the extinction material, solid material of the binder and the plasticizer) and the metal powder is, for example, 1:1 to 20:1. The amount of the organic components is adjusted in accordance with the porosity.

(Making process of a material for anode) Powder of a material having electron conductivity (for example, 100 nm to 10 μm of grain diameter), powder of a material having oxygen ion conductivity (for example, 100 nm to 10 μm of grain diameter), a solvent (20 wt % to 30 wt % of toluene, 2-propanol (IPA), 1-butanole, terpineol, butyl acetate, or ethanol, in accordance with viscosity), plasticizer (for example, 1 wt % to 6 wt % for the purpose of adjusting adhesion of a sheet), an extinction material (organic material), and a binder (PVB, acrylic resin, ethyl cellulose or the like) are mixed. Thus, slurry is made as a material for anode. A volume ratio of organic component (the extinction material, solid material of the binder and the plasticizer) and the powder of the material having electron conductivity is, for example, 1:1 to 5:1. The amount of the organic components is adjusted in accordance with the porosity. The diameters of the voids are controlled by adjusting the diameters of the extinction material. A volume ratio of the powder of the material having electron conductivity and the powder of the material having oxygen ion conductivity is, for example, 3:7 to 7:3.

(Making process of a material for electrolyte layer) Powder of a material having oxygen ion conductivity (for example, ScYSZ, YSZ or the like, and 10 nm to 1000 nm of grain diameter), a solvent (20 wt % to 30 wt % of toluene, 2-propanol (IPA), 1-butanole, terpineol, butyl acetate, or ethanol, in accordance with viscosity), plasticizer (for example, 1 wt % to 6 wt % for the purpose of adjusting adhesion of a sheet), a binder (PVB, acrylic resin, ethyl cellulose or the like) are mixed. Thus, slurry is made as a material for electrolyte layer. A volume ratio of organic component (solid material of the binder and the plasticizer) and the powder of the material having oxygen ion conductivity is, for example, 6:4 to 3:4.

(Making process of a material for cathode) Powder of lanthanum strontium cobaltite (LSC: $LaSrCoO_3$), a solvent (20 wt % to 30 wt % of toluene, 2-propanol (IPA), 1-butanole, terpineol, butyl acetate, or ethanol, in accordance with viscosity), plasticizer (for example, 1 wt % to 6 wt % for the purpose of adjusting adhesion of a sheet), and a binder (PVB, acrylic resin, ethyl cellulose or the like) are mixed, Thus, slurry is made as a material for cathode. A volume ratio of organic component (solid material of the binder and the plasticizer) and the LSC powder is, for example, 6:4 to 1:4.

(Firing Process) The material for porous metal is printed on a PET (polyethylene terephthalate) film. Thus, a supporter green sheet is made. The material for anode is printed on another PET film. Thus, an anode green sheet is made. The material for electrolyte layer is printed on another PET film. Thus, an electrolyte layer green sheet is made. For example, a plurality of supporter green sheets, on anode green sheet, and one electrolyte layer green sheet are stacked in this order. The resulting multilayer structure is stamped into a predetermined size. The resulting multilayer structure is fired in a temperature range of 1100 degrees C. to 1300 degrees C. in a reductive atmosphere. Thus, a half cell including the anode 20 and the electrolyte layer 30 is obtained.

(Impregnation process) Next, nitrates or chlorides of Zr, Y, Ba, Sr, La, Sc, Ce, Gd and Ni are solved in water or alcohol (such as ethanol, 2-propanol or methanol) on a presumption that one of $BaCe_{1-x}Zr_xO_3$ (BCZY, x=0 to 1) in which Y is doped, $SrCe_{1-x}Zr_xO_3$ (SCZY, x=0 to 1) in which Y is doped, $LaScO_3$ (LSS) in which Sr is doped, and Gd-doped cerin or a mixture thereof and Ni are generated at a predetermined temperature in a reductive atmosphere. The resulting nitrates or the resulting chlorides are impregnated into the half cell. And the half cell is dried. After that, the half cell is subjected to a plurality of thermal treatments. With respect to $BaCe_{1-x}Zr_xO_3$ (BCZY, x=0 to 1) in which Y is doped, nitrates or chlorides of Ba, Ce, Zr, Y and Ni are solved in water or alcohol (such as ethanol, 2-propanol or methanol) so that a presumption that $BaY_{0.2}Zr_{0.5}Ce_{0.3}$ and Ni are generated. The resulting nitrates or the resulting chlorides are impregnated into the half cell. And the half cell is dried. After that, the half cell is subjected to a plurality of thermal treatments at 350 degrees C. to 650 degrees C. With respect to $SrCe_{1-x}Zr_xO_3$ (SCZY, x=0 to 1) in which Y is doped, nitrates or chlorides of Sr, Ce, Zr, Y and Ni are solved in water or alcohol (such as ethanol, 2-propanol or methanol) so that $SrY_{0.2}Zr_{0.5}Ce_{0.3}$ and Ni are generated. The resulting nitrates or the resulting chlorides are impregnated into the half cell. And the half cell is dried. After that, the half cell is subjected to a plurality of thermal treatments at 350 degrees C. to 650 degrees C. With respect to $LaScO_3$ (LSS) in which Sr is doped, nitrates or chlorides of Sr, La, Sc and Ni are solved in water or alcohol (such as ethanol, 2-propanol or methanol) so that $La_{0.8}Sr_{0.2}Sc_{0.3}$ and Ni are generated. The resulting nitrates or the resulting chlorides are impregnated into the half cell. And the half cell is dried. After that, the half cell is subjected to a plurality of thermal treatments at 350 degrees C. to 650 degrees C.

(Reaction Prevention Layer) As the reaction prevention layer 40, $Ce_{0.8}Gd_{0.2}O_{2-x}$ having a thickness of 1 μm can be formed by PVD.

(Cathode Formation Process) Next, the material for cathode is printed on the reaction prevention layer 40 by a screen printing or the like and is dried. After that, the cathode is sintered by a thermal treatment. With the processes, the fuel cell 100 is fabricated.

In the manufacturing method of the embodiment, it is possible to adjust the average diameter and the diameter distribution of the voids in the anode 20, by adjusting the grain diameter of the extinction material mixed with the material for anode. In the embodiment, when the grain diameter of the extinction material mixed with the material for anode is adjusted, the average diameter of the voids in the anode 20 is adjusted to 2 μm or less. In this case, the anode 20 has a fine mesh frame. It is therefore possible to secure the bonding strength of the interface between the anode 20 and the electrolyte layer 30 and enlarge the porosity of the interface. It is therefore possible to increase the number of the reaction site. And, the average diameter is adjusted to 0.1 μm or more. In this case, the anode impregnation solution is impregnated to near the interface between the anode 20 and the electrolyte layer 30. The break of the anode catalyst is suppressed. And the break of the electron conduction path is suppressed. The D10% diameter is adjusted to 0.1 μm or more and 2 μm or less in the diameter distribution of the voids in the anode. In this case, it is possible to reduce the existence ratio of the voids of which the diameter is excessively small. It is therefore possible to sufficiently impregnate the anode catalyst. And, the D90% diameter is adjusted to 1 μm or and 7 μm or less in the diameter distribution. In this case, the existence ratio of the voids of which the diameter is excessively large can be reduced. It is therefore possible to secure the bonding strength of the interface between the anode 20 and the electrolyte layer 30.

As mentioned above, in the embodiment, the average diameter of the voids in the anode 20 is 0.1 μm or more and 2 μm or less. When the grain diameter of the extinction material is adjusted so that the D10% diameter of the diameter distribution of the voids is 0.1 μm or more and 2 μm or less and the D90% diameter of the diameter distribution of the voids is 1 μm or more and 7 μm or less, it is possible to improve the performance of the electrical power generation.

When the amount of the extinction material mixed with the material for anode is adjusted, it is possible to adjust the porosity of the anode 20. It is preferable that the porosity of the anode 20 is adjusted to 50% or more in the interface between the anode 20 and the electrolyte layer 30. It is more preferable that the porosity is adjusted to 80% or more. It is preferable that the porosity of the anode 20 is adjusted to 85% or less in the interface between the anode 20 and the electrolyte layer 30.

When the amount of the extinction material mixed with the material for anode is adjusted, it is possible to adjust the area ratio of the voids in the whole of the anode 20. For example, it is preferable that the area ratio is adjusted to 40% or more. It is more preferable that the area ratio is adjusted to 80% or less.

EXAMPLES

The fuel cell 100 was manufactured in accordance with the embodiment.

Example 1

Fe—Cr particles (average diameter: 20 μm), an extinction material and an organic binder were dispersed in organic solution. And a supporter green sheet having a thickness of 50 μm or more of the resulting slurry was made on a PET film. Next, Fe—Cr particles (average diameter: 5 μm), ScYSZ powder (grain diameter: 0.1 μm to 0.2 μm), an extinction material in which acrylic resin having a diameter of 1 μm and another acrylic resin having a diameter of 5 μm are mixed), an organic binder, and an organic solution were mixed and printed on a PET film. Thus, an anode green sheet having a thickness of 20 μm was made. Next, ScYSZ having a grain diameter of 0.1 μm to 0.2 μm, an organic binder and an organic solution were mixed and printed on a PET film. Thus, an electrolyte green sheet having a thickness of 10 μm was made. Seven supporter green sheets, one anode green sheet, and one electrolyte green sheet were stacked in this order and were stamped into a predetermined size so that the size became 5 cm×5 cm after firing. The resulting multilayer structure was subjected to a thermal treatment of 1100 degrees C. to 1300 degrees C. in a reductive atmosphere. And a half cell was obtained.

Nitrates or chlorides of Ce, Gd and Ni were solved in water or alcohol (such as ethanol, 2-propanol or methanol) on a presumption that $Ce_{0.8}Gd_{0.2}O_{2-x}$ and Ni were generated when firing the resulting solution at 850 degrees C. in a reductive atmosphere. The resulting nitrates or the resulting chlorides are impregnated into the half cell. And the half cell is dried. After that, the half cell is subjected to a plurality of thermal treatments at 350 degrees C. to 650 degrees C.

As the reaction prevention layer 40, $Ce_{0.8}Gd_{0.2}O_{2-x}$ having a thickness of 1 μm was formed by PVD. After that, $(La_{0.6}Sr_{0.4})_{0.99}(Co_{3-\delta})$ was printed by a screen printing.

Example 2

Acrylic resin having a diameter of 5 μm was used as the extinction material of the anode green sheet. Other conditions were the same as those of the example 1.

Example 3

Acrylic resin having a diameter of 8 μm was used as the extinction material of the anode green sheet. Other conditions were the same as those of the example 1.

Example 4

Acrylic resin having a diameter of 1 μm was used as the extinction material of the anode green sheet. Other conditions were the same as those of the example 1.

Comparative Example 1

Acrylic resin having a diameter of 10 μm was used as the extinction material of the anode green sheet. Other conditions were the same as those of the example 1.

Comparative Example 2

An amount of the extinction material of the anode green sheet was 1.5 times as that of the example 1. Other conditions were the same as those of the example 1.

(Analysis) Mixed gas of $H_2$ gas and $N_2$ gas was supplied to the anode side of the samples of the examples 1 to 4 and the comparative examples 1 and 2. Mixed gas of $O_2$ gas and $N_2$ gas was supplied to the cathode side of the samples. And the samples were heated to 850 degrees C. After that, a test of electrical power generation was performed. Cross sections were observed by a SEM. Each diameter of voids in the anode was measured. From SEM pictures, a total length of the voids contacting to the interface between the electrolyte layer and the anode and a total length of closed portions were measured. And porosities were calculated. Table 1 shows the results. A few anode cross sections in the stacking direction were taken by a SEM with 5000 to 10000 magnifications. Tangential line diameters in a constant direction of the voids in a total area of 50×50 μm or more were measured, Thus, diameter distribution (D10% and D90%) and an average diameter were measured. An area of the voids in the total area was calculated with image analysis software. And, a ratio of the calculated area with respect to the whole area for measurement was calculated as an area ratio. The area ratio was used as the porosity of the whole area. Moreover, with respect to diameters of voids existing in an area from the interface to 1 μm toward the anode side, tangential line diameters in a constant direction in parallel with the interface were measured in 50 μm range. And, in accordance with the following formula, the porosity of the interface was measured.

{Porosity(%) in the interface}={a total of the measured void diameters(μm)}/{a length of the interface(50μ)}×100

TABLE 1

| | EXAMPLE 1 | EXAMPLE 2 | EXAMPLE 3 | EXAMPLE 4 | COMPARATIVE EXAMPLE 1 | COMPARATIVE EXAMPLE 2 |
|---|---|---|---|---|---|---|
| AVERAGE VOID DIAMETER (μm) | 0.6 | 1.8 | 2 | 0.1 | 2.5 | 2.2 |
| D10% (μm) | 0.6 | 1.2 | 2 | 0.1 | 2.3 | 0.8 |
| D90% (μm) | 1.7 | 5.0 | 7 | 1.1 | 10 | 8 |
| POROSITY OF INTERFACE (%) | 79 | 63 | 50 | 85 | 45 | 81 |
| WHOLE POROSITY (%) | 55 | 43 | 40 | 80 | 40 | 83 |
| FILM PEELING | NO | NO | NO | NO | NO | YES |
| REACTION RESISTANCE ($\Omega \cdot cm^2$) | 1 OR LESS | 1 OR LESS | 1.2 | 1 OR LESS | 2 | — |
| ELECTRONIC RESISTANCE ($\Omega \cdot cm^2$) | 0.1 OR LESS | 0.1 OR LESS | 0.15 | 0.15 | 0.15 | — |

Figure 4:
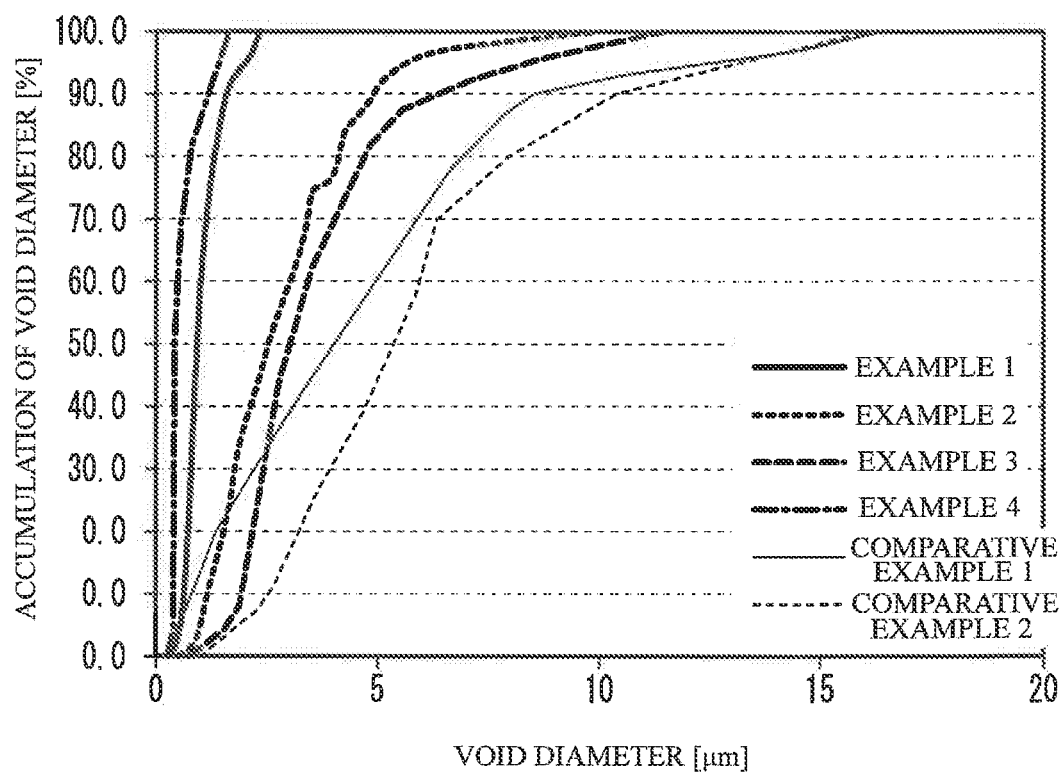
FIG. 4 illustrates void diameter distribution of examples 1 to 4 and comparative examples 1 and 2.

FIG. 4 illustrates void diameter distribution of the examples 1 to 4 and the comparative examples 1 and 2. When the void diameter distribution is measured as illustrated in FIG. 4, it is possible to measure the D10% diameter and the D90% diameter.

In the example 1, the average void diameter of the anode was 0.6 μm. The porosity of the anode in the interface between the anode and the electrolyte layer was 79%. The D10% diameter in the void diameter distribution was 0.6 μm. The D90% diameter was 1.7 μm. The porosity of the whole of the anode was 55%.

Although the porosity of the anode in the interface between the anode and the electrolyte layer was large, the film peeling was not observed. It is though that this was because sufficient bonding strength was achieved because the average void diameter of the anode was 2 μm or less and the D90% diameter was 1 μm or more and 7 μm or less. The electronic resistivity was 0.1 $\Omega/cm^2$ or less which was a favorable value. It is thought that this was because the anode catalyst was sufficiently impregnated and break of the electron conduction path was suppressed because the average void diameter of the anode was 0.1 μm or more and the D10% diameter was 0.1 μm or more and 2 μm or less. The reaction resistance at 650 degrees C. was 1 $\Omega/cm^2$ or less which was a favorable value. It is thought that this was because the number of the reaction site was increased and the performance of the electrical power generation was improved.

In the example 2, the average void diameter of the anode was 1.8 μm. The porosity of the anode in the interface between the anode and the electrolyte layer was 63%. The D10% diameter in the void diameter distribution was 1.2 μm. The D90% diameter was 5.0 μm. The porosity of the whole of the anode was 43%.

Although the porosity of the anode in the interface between the anode and the electrolyte layer was large, the film peeling was not observed. It is though that this was because sufficient bonding strength was achieved because the average void diameter of the anode was 2 μm or less and the 090% diameter was 1 μm or more and 7 μm or less. The electronic resistivity was 0.1 $\Omega/cm^2$ or less which was a favorable value. It is thought that this was because the anode catalyst was sufficiently impregnated and break of the electron conduction path was suppressed because the average void diameter of the anode was 0.1 μm or more and the D10% diameter was 0.1 μm or more and 2 μm or less. The reaction resistance at 650 degrees C. was 1 $\Omega/cm^2$ or less which was a favorable value. It is thought that this was because the number of the reaction site was increased and the performance of the electrical power generation was improved.

In the example 3, the average void diameter of the anode was 2 μm. The porosity of the anode in the interface between the anode and the electrolyte layer was 50%. The D10% diameter in the void diameter distribution was 2 μm. The D90% diameter was 7 μm. The porosity of the whole of the anode was 40%.

Although the porosity of the anode in the interface between the anode and the electrolyte layer was large, the film peeling was not observed. It is though that this was because sufficient bonding strength was achieved because the average void diameter of the anode was 2 μm or less and the D90% diameter was 1 μm or more and 7 μm or less. The electronic resistivity was 0.15 $\Omega/cm^2$ which was a favorable value. It is thought that this was because the anode catalyst was sufficiently impregnated and break of the electron conduction path was suppressed because the average void diameter of the anode was 0.1 μm or more and the D10% diameter was 0.1 μm or more and 2 μm or less. The reaction resistance at 650 degrees C. was 1 $\Omega/cm^2$ which was a favorable value. It is thought that this was because the number of the reaction site was increased and the performance of the electrical power generation was improved.

In the example 4, the average void diameter of the anode was 0.1 μm. The porosity of the anode in the interface between the anode and the electrolyte layer was 85%. The D10% diameter in the void diameter distribution of the anode was 0.1 μm. The D90% diameter was 1.1 μm. The porosity of the whole of the anode was 80%.

Although the porosity of the anode in the interface between the anode and the electrolyte layer was large, the film peeling was not observed. It is though that this was because sufficient bonding strength was achieved because the average void diameter of the anode was 2 μm or less and the D90% diameter was 1 μm or more and 7 μm or less. The electronic resistivity was 0.15 $\Omega/cm^2$ which was a favorable value. It is thought that this was because the anode catalyst was sufficiently impregnated and break of the electron conduction path was suppressed because the average void diameter of the anode was 0.1 μm or more and the D10% diameter was 0.1 μm or more and 2 μm or less. The reaction resistance at 650 degrees C. was 1 $\Omega/cm^2$ or less which was a favorable value. It is thought that this was because the number of the reaction site was increased and the performance of the electrical power generation was improved.

In the comparative example 1, the average void diameter of the anode was 2.5 μm. The porosity of the anode in the interface between the anode and the electrolyte layer was 45%. The D10% diameter in the void diameter distribution on the anode was 2.3 μm. The D90% diameter was 10 μm. The porosity of the whole of the anode was 40%. The reaction resistance at 650 degrees C. was 2 $\Omega/cm^2$ which was a bad value, because the average void diameter was 2.5 μm which was a large value and the porosity in the interface was 45% which was a low value. The electronic resistivity was 0.15 $\Omega/cm^2$. The film peeling was not observed.

In the comparative example 2, the average void diameter of the anode was 2.2 μm. The porosity of the anode in the interface between the anode and the electrolyte layer was 81%. The D10% diameter in the void diameter distribution of the anode was 0.8 μm. The D90% diameter was 8 μm. The porosity of the whole of the anode was 83%, The film peeling locally occurred in the interface. It is thought that this was because the porosity was increased and the bonding strength was small because the average void diameter was more than 2 μm.

Although the embodiments of the present invention have been described in detail, it is to be understood that the various change, substitutions, and alterations could be made hereto without departing from the spirit and scope of the invention.

What is claimed is:

1. A fuel cell comprising:
   a porous anode; and
   an electrolyte layer that is provided on the anode and includes solid oxide having oxygen ion conductivity,
   wherein the anode has a structure in which an anode catalyst is provided in a void,
   wherein, in a cross section of the anode and the electrolyte layer in a stacking direction thereof, an average void diameter of voids in the anode is 0.1 μm or more and 2 μm or less,
   wherein, in the cross section, a D10% diameter of void diameter distribution of the voids in the anode is 0.1 μm or more and 2 μm or less,
   wherein a D90% diameter of the void diameter distribution is 1.1 μm or more and 7 μm or less.

2. The fuel cell as claimed in claim 1, wherein a porosity of the anode is 50% or more and 85% or less in an interface between the anode and the electrolyte layer.

3. The fuel cell as claimed in claim 1, wherein a porosity of a whole of the anode is 40% or more and 80% or less.

4. The fuel cell as claimed in claim 1, wherein the anode catalyst includes Ni, and one of $BaCe_{1-x}Zr_xO_3$(BCZY, x=0 to 1) in which Y is doped, $SrCe_{1-x}Zr_xO_3$(SCZY, x=0 to 1) in which Y is doped, $LaScO_3$ (LSS) in which Sr is doped, and Gd-doped ceria or a mixture thereof.

5. The fuel cell as claimed in claim 1, wherein the void in the anode was formed by Fe—Cr ahoy and scandia-yttria-stabilized zirconium, or formed by only the Fe—Cr ahoy, or formed by only the scandia-yttria-stabilized zirconium.

6. The fuel cell as claimed in claim 1, wherein a thickness of the anode is 5 μm or more and 50 μm or less.

7. A manufacturing method of a fuel cell comprising:
   preparing a structure in which an electrolyte layer having oxygen ion conductivity is provided on a porous anode, wherein the anode has a structure in which an anode catalyst is provided in a void, wherein, in a cross section of the anode and the electrolyte layer in a stacking direction thereof, an average void diameter of voids in the anode is 0.1 μm or more and 2 μm or less, wherein, in the cross section, a D10% diameter of void diameter distribution of the voids in the anode is 0.1 μm or more and 2 μm or less, wherein a D90% diameter of the voids diameter distribution is 1.1 μm or more and 7 μm or less; and
   impregnating the anode catalyst into the anode.

8. The fuel cell as claimed in claim 1, wherein the average void diameter of voids in the anode is 0.6 μm or more and 2 μm or less.

9. The fuel cell as claimed in claim 1, wherein the D90% diameter of the void diameter distribution is 1.2 μm or more and 7 μm or less.

* * * * *